Patented Nov. 18, 1947

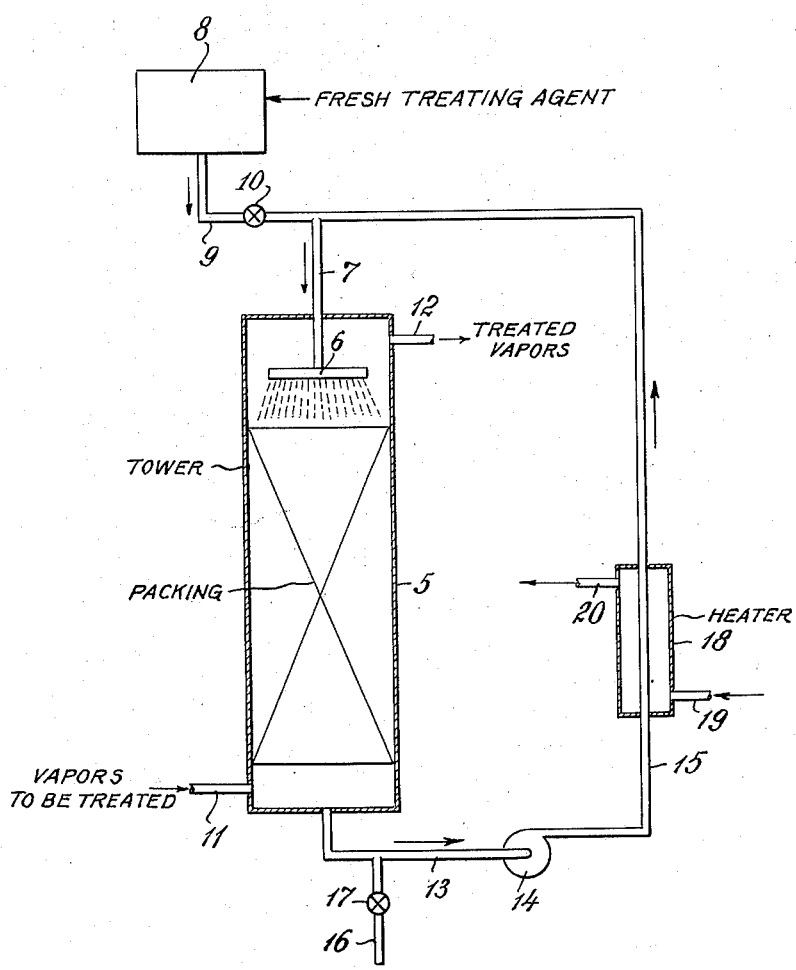

2,430,982

UNITED STATES PATENT OFFICE 2,430,982

METHOD FOR REMOVING VOLATILE SULFUR COMPOUNDS FROM HYDROCARBON GASES

Charles O. Hoover, Houston, Tex., assignor to Air Reduction Company, Incorporated, New York, N. Y., a corporation of New York Application February 3, 1945, Serial No. 576,080

6 Claims. (Cl. 260—676)

This invention relates to the removal of certain undesirable volatile sulfur compounds from gases and vapors and particularly from hydrocarbons in the gaseous phase. Many types of industrial gases and vapors and compounds which can be converted readily to the gaseous phase contain undesirable sulfur compounds such as hydrogen sulfide, mercaptans and disulfides. Since some of these sulfur compounds readily cause corrosion in pumps, pipe lines and other equipment, the presence thereof is highly objectionable. Natural gas and hydrocarbon gases produced in processing of petroleum, such as still gases and stabilizer gases, ordinarily contain the sulfur compounds mentioned, and it is desirable to remove such compounds, particularly where the gases are used in chemical processes such as the production of hydrogen, olefins, di-olefins, acetylenes, motor fuels, etc.

Heretofore it has been the practice to effect, so far as possible, the removal of hydrogen sulfide and mercaptans from gases and vapors such as those mentioned, by scrubbing with caustic solutions, sodium plumbite and other reagents. These methods involve the use of aqueous solutions which necessitate subsequent drying of the gases and in the case of mercaptans and disulfides particularly, are not completely effective.

It is the object of the present invention to provide a method for the removal of hydrogen sulfide, mercaptans and disulfides from gases and vapors in an economical and satisfactory manner.

A further object of the invention is to provide a method for the removal of the undesirable sulfur compounds mentioned from gases and vapors, avoiding the use of aqueous solutions.

Other objects and advantages of the invention will be apparent as it is better understood by reference to the following specification and accompanying drawing, illustrating diagrammatically an apparatus suitable for the practice of the invention.

I have discovered that hydrogen sulfide, mercaptans and disulfides can be readily and completely removed from gases and vapors, especially those of hydrocarbon compounds, by scrubbing the gas or vapor with a solution of cuprous naphthenate dissolved in an oil or other non-aqueous solvent. This may be accomplished by passing the gas or vapor through a body of cuprous naphthenate in solution, or more conveniently through a tower in which the gas or vapor flows upwardly against a descending stream of the solution of cuprous naphthenate flowing over suitable plates, baffles or packing to ensure maximum surface contact between the gases or vapors and the descending liquid. It is desirable, moreover, to circulate the solution of cuprous naphthenate to ensure complete utilization of the available reagent. The operation may be conducted at ordinary atmospheric temperature, but where it is necessary to maintain the vapor phase of the material treated by heating, the solution of cuprous naphthenate may be heated to any desirable temperature as it is circulated and returned for further use.

The cuprous naphthenate may be dissolved in any suitable solvent other than water which has a boiling point higher than the condensing temperature of the purified vapor or gas at the pressure employed. Thus selection of the solvent will depend to some extent upon the particular material from which the sulfur compounds are to be removed. When operating at ordinary atmospheric temperatures, I prefer to use gas oil as the solvent for the cuprous naphthenate. At higher temperatures, a less volatile oil, of which many are available, including numerous petroleum products, may be used. Other organic solvents for cuprous naphthenate are also available. The amount of cuprous naphthenate used will depend upon the amount and nature of the sulfur compounds which are to be separated from the material treated. The cuprous naphthenate may conveniently be used in a dilute solution ranging in concentration from a fraction of 1% to about 10% or more. It may be added as cuprous naphthenate to the solvent, or cupric naphthenate can be added to the solvent which is then subjected to reducing conditions to convert the cupric naphthenate to cuprous naphthenate.

The cuprous naphthenate reacts with hydrogen sulfide to form cuprous sulfide which is precipitated as a finely divided solid and remains in suspension in the solvent. It reacts with mercaptans to form cuprous mercaptide, which is non-volatile. The reaction with disulfides is somewhat more complicated. The disulfides are, however, converted to relatively stable, non-volatile compounds, and are thus removed from the gas or vapor treated.

Referring to the drawing, 5 indicates a tower, preferably packed in the usual manner to ensure maximum contact between the gases or vapors and the liquid which is supplied through a head 6 by a pipe 7 connected to a storage tank 8 by a pipe 9 controlled by a valve 10. The liquid, consisting of a solution of cuprous naphthenate as hereinbefore described, flows downwardly over the packing in contact with the gases or vapors to be treated which are introduced through a pipe 11 at the bottom of the column. The gases or vapors free from sulfur compounds are withdrawn through a pipe 12 at the top of the tower and may be delivered to any suitable storage receptacle.

The solution of cuprous naphthenate is withdrawn from the bottom of the tower through a pipe 13 and delivered by a pump 14 to a pipe 15 which returns it to the pipe 7. In the operation, circulation is continuous. Additional solution may be supplied from the tank 8 as required. An amount of the solution equivalent to that introduced is withdrawn through the pipe 16 controlled by a valve 17. Where the operation is conducted at temperatures above the normal atmospheric temperature, the heater 18 may be utilized to raise the temperature of the solution circulating through the pipe 15 by circulation of a suitable heating agent through the pipes 19 and 20. Thus the operation may be conducted in the tower 5 at any desirable temperature to maintain the vapor phase of the material treated, the solvent for the cuprous naphthenate being selected to remain in the liquid phase at that temperature.

As an example, I may take a fraction derived from natural gas containing hydrocarbons of 2, 3 and 4 carbon atoms. Such fractions are widely used in the production of olefins and di-olefins by pyrolysis. These fractions are also used in alkylation reactions for the production of high octane gasoline. The hydrogen sulfide, mercaptans and disulfides can be removed from the natural gas fraction in the manner hereinbefore described to obtain a dry, sulphur-free product. Such a product may then be processed without the hazard of corrosion attending the use of gases containing hydrogen sulfide and mercaptans. The dry product, free from objectionable sulfur compounds, is particularly desirable as raw material in processes involving the use of catalysts, the latter being particularly susceptible to poisoning by these sulfur compounds.

As another example, I may take the vapor effluent from a crude petroleum still and subject it to purification in the manner described, obtaining a vapor thereby which is free from hydrogen sulfide, mercaptans and disulfides. The vapor on condensing may be separated into gasoline and kerosene fractions which may be used without further treatment for the removal or modification of sulfur compounds.

As another example, the vapor effluent from a pressure still may be treated in the manner described to obtain vapors free from hydrogen sulfide, mercaptans and disulfides which are highly unsaturated. Such treated vapor products may be separated into fractions which are normally liquid and normally gaseous. The liquid fractions are suitable for the production of high-grade gasoline, and the gaseous fractions may be used in the chemical industry. Both fractions obtained in the manner described are free from objectionable sulfur compounds.

The foregoing examples are merely illustrative of the many applications of the invention to the production of gases and vapors which are free from hydrogen sulfide, mercaptans and disulfides and therefore non-corrosive and non-poisonous to catalysts. A particular advantage of the procedure in addition to the removal of objectionable sulfur compounds is the freedom of the product from aqueous vapors. Being dry, the product need not be subjected to expensive drying operations before it is utilized.

While cuprous naphthenate is the preferred reagent in the method, other lower valence copper compounds such as the oleate, linoleate, stearate, resinate, and acetate may be used similarly with like results. It is essential to avoid the cupric compounds which do not afford the advantages of the present invention.

Various changes may be made in the details of the procedure and in the apparatus employed without departing from the invention or sacrificing the advantages thereof.

I claim:

1. The method of producing hydrocarbon gases substantially free from hydrogen sulfide, mercaptans and disulfides which comprises contacting the hydrocarbon gas with a solution of cuprous naphthenate in an organic liquid having a boiling point higher than the condensing temperature of the purified hydrocarbon gas at the pressure employed.

2. The method of removing hydrogen sulfide, mercaptans and disulfides from a hydrocarbon gas, the said method comprising contacting the hydrocarbon gas with a solution of a cuprous compound in an organic liquid having a boiling point higher than the condensing temperature of the purified hydrocarbon gas at the pressure employed.

3. The method of removing hydrogen sulfide, mercaptans and disulfides from a hydrocarbon gas, the said method comprising contacting the hydrocarbon gas with a solution of a cuprous compound in a petroleum oil having a boiling point higher than the condensing temperature of the purified hydrocarbon gas at the pressure employed.

4. The method of removing hydrogen sulfide, mercaptans and disulfides from a hydrocarbon gas, the said method comprising contacting the hydrocarbon gas with a solution of cuprous resinate in a petroleum oil having a boiling point higher than the condensing temperature of the purified hydrocarbon gas at the pressure employed.

5. The method of producing hydrocarbon gas substantially free from hydrogen sulfide, mercaptans and disulfides which comprises contacting the hydrocarbon gas with a solution of cuprous naphthenate in a petroleum oil having a boiling point higher than the condensing temperature of the purified hydrocarbon gas at the pressure employed.

6. The method of removing hydrogen sulfide, mercaptans and disulfides from a hydrocarbon gas, the said method comprising contacting the hydrocarbon gas with a solution of cuprous oleate in a petroleum oil having a boiling point higher than the condensing temperature of the purified hydrocarbon gas at the pressure employed.

CHARLES O. HOOVER.

REFERENCES CITED

The following references are of record in the file of this patent:

UNITED STATES PATENTS

| Number | Name | Date |
|---|---|---|
| 2,372,084 | Jones | Mar. 20, 1945 |
| 2,066,213 | Merchant | Dec. 29, 1936 |
| 2,297,620 | Henderson et al. | Sept. 29, 1942 |
| 2,276,526 | Von Fuchs et al. | Mar. 17, 1942 |
| 1,365,894 | Day | Jan. 18, 1921 |
| 1,608,339 | Ridge et al. | Nov. 23, 1926 |